United States Patent [19]

Bruns et al.

[11] Patent Number: 4,816,955
[45] Date of Patent: Mar. 28, 1989

[54] ROBOT JOINT WITH AN ELECTRIC DRIVE MOTOR

[75] Inventors: Joachim Bruns, Lichtenwald; Gerhard Gosdowski, Bietigheim-Bissingen; Andreas Kettner, Stuttgart; Udo Schwarze, Ditzingen, all of Fed. Rep. of Germany

[73] Assignee: Robert Bosch GmbH, Stuttgart, Fed. Rep. of Germany

[21] Appl. No.: 26,908

[22] PCT Filed: Apr. 10, 1986

[86] PCT No.: PCT/DE86/00154
§ 371 Date: Dec. 1, 1986
§ 102(e) Date: Dec. 1, 1986

[87] PCT Pub. No.: WO86/07556
PCT Pub. Date: Dec. 31, 1986

[30] Foreign Application Priority Data

Jun. 22, 1985 [DE] Fed. Rep. of Germany ....... 3522337

[51] Int. Cl.⁴ ............................................. B25J 9/00
[52] U.S. Cl. ........................................ 361/1; 901/13; 414/5; 414/744 R; 74/816; 200/47
[58] Field of Search ................ 414/744 R, 5, 4; 901/13, 28, 11, 12, 9; 403/84, 96; 74/816; 361/179, 180.1; 307/119, 116, 326; 200/47, 340

[56] References Cited

U.S. PATENT DOCUMENTS

| | | | |
|---|---|---|---|
| 2,798,908 | 7/1957 | Frank et al. | 200/18 |
| 3,294,256 | 12/1966 | Nazali et al. | 214/6 |
| 3,419,158 | 12/1968 | Lemelson | 414/728 |
| 4,586,868 | 5/1986 | Nakashima et al. | 901/12 |

FOREIGN PATENT DOCUMENTS

| | | |
|---|---|---|
| 1179077 | 10/1964 | Fed. Rep. of Germany . |
| 3006243 | 8/1981 | Fed. Rep. of Germany . |
| 2153036 | 4/1973 | France . |
| WO84/01740 | 5/1984 | PCT Int'l Appl. . |

*Primary Examiner*—A. D. Pellinen
*Assistant Examiner*—Todd E. DeBoer
*Attorney, Agent, or Firm*—Michael J. Striker

[57] ABSTRACT

Robot joint with an electric drive motor (30), a limit switch (36) for a safety shut off of the same, and a sensor (100) for the zero position-scanning of the joint. The limit switch (36) is actuated by annular segment like platform pieces (50) which are securable in different angle positions on a front face of the one robot part (12). For this purpose, a divided support ring (72,74) is provided which is securable in different angle positions independent from the platform pieces (50) and which has a side face (96,98) which influences the sensor (100).

18 Claims, 2 Drawing Sheets

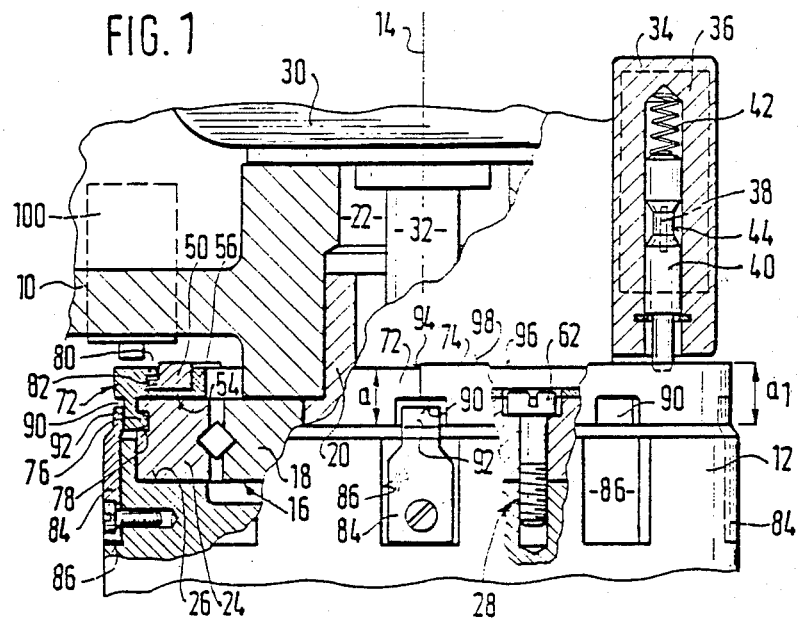

ROBOT JOINT WITH AN ELECTRIC DRIVE MOTOR

BACKGROUND OF THE INVENTION

The invention relates to a robot joint with an electric drive motor. In a known robot joint of this type (DE-A1 33 10 135) the actuating element for the limit switch which is rigidly connected with the one robot part is in form of a pin which extends into a radial bore of the one robot part and acts on two limit switches by means of drag cams and a rocker arm which is guided in a curved piece which is mounted on the other robot part together with the limit switches. This device which is suitable for pivot ranges of more than 360° is very expensive, if the the pivot range is less than 360°, and moreover it is not possible to adjust the pivot range to a given position and size.

SUMMARY OF THE INVENTION

The device in accordance with the invention is simple, compact and reliable and permits to integrate the actuating element or elements in a protected manner in the joint and to provide an easy adjustability therefor.

The invention enables a simple and problemless installation of the actuating elements or elements in the given desired position. With the design of the actuating elements in accordance with claim one embodiment the same can be easily moved outwardly from their installed position, if they have to be removed or if they should be installed in a different position.

The features in accordance with other embodiments are suggested for a radial and axial mounting of the actuating elements in the installed position. With these features it is achieved that the structural parts provided for these functions can be radially attached and can be mounted or released from the one robot part by exclusively applying the tools at the circumference.

The device in accordance with the invention also provides a sensor for scanning a joint-zero position in axial direction of the joint in addition to the limit switch without any additional space requirement.

It is particularly advantageous if the zero position-scanning is performed, because additional parts for this function are eliminated and when using a divided retaining ring each ring half may be provided with plane front faces (rotating part).

Advantageously, the sensor for the zero position-scanning with a limit switch may be disposed in a common housing. Advantageous means for a delay free acting short circuit brake may be associated with the drive motor, which assure a safe and rapid stopping of the drive when leaving the operating range of the movable robot part and during the relay of the limit switch.

BRIEF DESCRIPTION OF THE DRAWINGS

One exemplified embodiment of the invention is illustrated in the drawing and is described in more detail in the subsequent description. The drawings show:

FIG. 1 the robot joint in accordance with the invention in a side view and partially in a section, FIG. 2 a plan view of individual parts of the robot joint in accordance with FIG. 1; and FIG. 3 an individual part from FIG. 2 seen in direction of arrow A.

DESCRIPTION OF THE PREFERRED EMBODIMENTS

The robot joint connects a robot part 10 which in the following is called a tripod, but it also could be a pre-mounted robot arm, with a robot arm 12 which is pivotably mounted on tripod 10 around a joint axis 14. The mounting is performed free of play by means of a pre-tensioned roller bearing 16, preferably a junction roller bearing, whose inner barrel ring 18 is mounted on a steel bushing 20 which is pressed into a bore 22 in tripod 10. The outer barrel ring 24 of the roller bearing 16 sits properly in a recess 26 of the robot arm 12 and is mounted thereon free from play by two diametrically opposite screws 28.

An electromotor 30 is mounted on the tripod coaxially with respect to the joint axis 14, whose downwardly extending power output shaft 32 is connected with the robot arm 12 by means of a reduction gear. The structure of the reduction gear is immaterial in conjunction with this subject matter, so that no illustration and no description of the same is provided. The electromotor 30 drives the robot arm 12 in a rotating manner with respect to the tripod 10 in a program controlled manner, whereby the robot arm 12 is pivoted from one operating position to the other.

Furthermore, a laterally removable housing 34 is mounted on tripod 10 which contains a limit switch 36, whose switch plunger being provided with a roller 38 is vertically movable with respect to the plane of the drawing. A switch bolt 40 is used for actuating the limit switch 36 which is displaceably fed in housing 34 parallel to the joint axis 14. A spring 42 acts on the switch bolt 40 which pushes the switch bolt 40 downwardly against actuating elements on robot arm 12 which will be described in more detail in the following.

At about the longitudinal center the switching bolt 40 is provided with an annular groove 44 being disposed opposite the roller 38 on the switching plunger of the limit switch 36, if the switching bolt 40 is in its lower switching position illustrated in FIG. 1. In this position an internal spring of the switch pushes the roller 38 into the annular groove 44 of the switch bolt 40, whereby the limit switch assumes a first switch position. After a defined rotation of the robot arm 12 with respect to the tripod 10, the actuating elements move the switching bolt 40 upwardly, whereby the roller 38 is pushed out of the annular groove 44 and the limit switch 36 is fed into a second switching position.

The actuating elements for the limit switch 36 being mounted on the robot arm 12 consist of two uniformly shaped annular segment like platform pieces 50 which are provided at their ends with one each oblique run up or run off face 52. The two platform pieces 50 are mounted on a support ring 54, which in turn is supported on the upper front face of the outer barrel ring 24 of the roller bearing 16. The support ring 54 is provided with an upwardly extending annular collar 56 on its inner edge, at the outer circumferential face 58 of the same the platform pieces 50 abut and are centered with respect to the joint axis 14. The radiuses of the annular collar 56 and the platform pieces 50 are so dimensioned that the axis of the switch bolt 40 meets at about the center diameter line of the platform pieces 50.

The support ring 54 is provided with two diametrically opposite recesses 60 for heads 62 of screws 28 which secure the support ring 54 against rotating with respect to the robot arm 12. Furthermore, the support ring 54 is provided with a plurality equidistant uniformly wide radial edge recesses 64 which are used to retain the platform pieces 50 in defined angle positions. For this purpose, each platform piece 50 is provided with a radially extending projection 66 which fittingly engages into one of the edge recesses 64. This arrangement provides that the platform pieces 50 can be mounted in radial direction in the specified angle position on the support ring 54 or the robot arm 12.

Each platform piece 50 is provided at both sides of the projection 66 with a recess 68 which is provided with an opening toward the outer circumference and which on the inside ends in an undercut 70. The recesses 68 are used for introducing tools with the aid of which the platform pieces 50 may be pulled out in radial direction from the support ring 54.

A retaining ring is provided for centering and retaining the support ring 54 on the outer barrel ring 24, as well as for retaining the platform pieces 50 on the support ring 54, which consists of two annular halves 72 and 74 which also can be attached to the robot arm 12 from the circumference. One of the halves can be composed of metal, while the other half is composed of non-metal. The retaining ring 72,74 is provided with a first annular collar 76 directed inwardly on the lower edge which engages into an annular groove 78 in the outer barrel ring 24. The divided retaining ring 72,74 is provided with a second inwardly directed annular collar 80 at the upper edge which fittingly engages the platform pieces 50 over a flange edge 82, thus performing the intended centering and retaining function for the support ring 54 and the platform pieces 50.

The retaining ring 72,74 is mounted free from play on the outer barrel ring 24 by a plurality of cover plates 84 which are screwed to the robot arm 12. The cover plates 84 are fittingly inserted in indentations 86 on a cylindrical circumferential segment 68 of the robot arm 12 which concentrically encompasses the joint axis 14. The indentations 86 are uniformly distributed over the circumference and with the same graduation indentations 90 for a fitting receiving of the retaining segments 92 of the cover plates 84 as are provided on the circumference of the retaining ring 72,74. Due to this arrangement the retaining ring 72,74 or the expansion joints of its ring halves may be positioned in a plurality of angle positions on the robot arm 12.

The two ring halves 72,74 of the retaining ring are provided with a difference in large measure of elevation a or $a_1$, so that at each expansion joint a step 94 is provided between the two exposed side faces 96 and 98 of the ring halves 72,74. An inductive sensor 100 is disposed with a slight distance opposite to the side faces 96,98 which feeds a signal to the program control device of the robot when one of the steps 94 moves below sensor 100. This signal may preferably be used for an electrical scanning of the zero position of the robot joint. The zero position can be adjusted by the described design of the parts in steps.

The sensor 100 may preferably be disposed in a common housing together with the limit switch 36. The signal emission of the sensor 100 can be adjusted or set independent from the relay points of the limit switch 36. The stopping of the joint movement, when leaving the operation range, may be performed rapidly and securely by a short circuit braking of the electromotor 30 which occurs free of delay during the running up of the switch bolt 40 to a platform piece 50.

We claim:

1. A robot joint for a robot, comprising:
   a first robot element;
   a second robot element drivable by a driving means to rotate relative to said first element;
   safety shut off means arranged for shutting off a driving means and including limit switch means; and
   means for actuating said switch means and including at least one actuating member connected to one of said robot elements so that said actuating member actuates said switch means when said second robot element is rotated a predetermined angular distance relative to said first robot element, the other one of said robot elements having a front face, said actuating member being formed as a ring-segment shaped platform piece adjustably retained at said front face.

2. The robot joint as defined in claim 1, wherein said robot elements have a common joint axis; further comprising:
   means for supporting and centering said actuating member with respect to said joint axis and including a support ring member with a shoulder face, said actuating member being supported on said shoulder face.

3. The robot joint as defined in claim 2, wherein said support ring member has an axial annular collar, said shoulder being formed on said collar.

4. The robot joint as defined in claim 1 further comprising
   means for sensing a zero position of the robot joint and including a sensor.

5. The robot joint as defined in claim 1, wherein the other one of said robot elements has a front face, said actuating element being retained at said front face.

6. A robot joint for a robot with driving means, the robot joint comprising:
   a first robot element;
   a second robot element drivable by a driving means to rotate relative to said first element, said robot means having a common joint axis;
   safety shut off means arranged for shutting off a driving means and including limit switch means;
   means for actuating said switch means and including at least one actuating member connected to one of said robot elements so that said actuating member actuates said switch means when said second robot element is rotated a predetermined angular distance relative to said first robot element;
   means for supporting and centering said actuating member with respect to said joint axis and including a support ring member with a shoulder face, said actuating member being supported on said shoulder face; and
   means for interlocking said actuating member and said support ring member circumferentially and including a plurality of interlockable recesses and projections, said projections and said recesses being arranged in said members circumferentially and being formed to interlock with each other so that said actuating member is secured in a circumferential direction with respect to said support ring member.

7. The robot joint as defined in claim 6, wherein said members are formed so that said actuating member and said support ring member are securable in at least two positions relative to each other.

8. A robot joint for a robot with driving means, the robot joint comprising:

a first robot element;

a second robot element drivable by a driving means to rotate relative to said first element;

safety shut off means arranged for shutting off a driving means and including limit switch means;

means for actuating said switch means and including at least one actuating member connected to one of said robot elements so that said actuating member actuates said switch means when said second robot element is rotated a predetermined angular distance relative to said first robot element; and means for securing said actuating member and said support ring member in said at least two positions and including uniformly shaped recesses, one of said members having a radial edge, said recesses being formed on said radial edge, the other of said members forming projection interlocking with said recesses.

9. A robot joint for a robot with driving means, the robot joint comprising:

a first robot element;

a second robot element drivable by a driving means to rotate relative to said first element, said robot elements having a common joint axis;

safety shut off means arranged for shutting off a driving means and including limit switch means;

means for actuating said switch means and including at least one actuating member connected to one of said robot elements so that said actuating member actuates said switch means when said second robot element is rotated a predetermined angular distance relative to said first robot element;

means for supporting and centering said actuating member with respect to said joint axis and including a support ring member with a shoulder face, said actuating member being supported on said shoulder face; and means for releasing said actuating member from said support ring member, said actuating member having an outer circumference, said releasing means including a recess formed in said outer circumference.

10. A robot joint for a robot with driving means, the robot joint comprising:

a first robot element;

a second robot element drivable by a driving means to rotate relative to said first element, said robot elements having a common joint axis;

safety shut off means arranged for shutting off a driving means and including limit switch means;

means for actuating said switch means and including at least one actuating member connected to one of said robot elements so that said actuating member actuates said switch means when said second robot element is rotated a predetermined angular distance relative to said first robot element;

means for supporting and centering said actuating member with respect to said joint axis and including a support ring member with a shoulder face, said actuating member being supported on said shoulder face; and means for centering said support ring with respect to said joint axis and including a retaining ring detachably mounted on the other one of said robot elements and fittingly engaging said actuating member so as to center said support ring.

11. The robot joint as defined in claim 10, further comprising:

ball bearing means pivotally connecting said first and second robot elements together, said ball bearing means including an outer barrel ring, said retaining ring being centered and detachably retained on said outer barrel ring.

12. The robot joint as defined in claim 10, wherein said retaining ring is divided into separate retaining parts parts; further comprising:

engaging means for engaging said retaining ring parts with said other robot element and with said actuating member, said engaging means including engaging portions formed as a plurality of engagable recesses and grooves, said parts forming at least two of said engaging portions, said other one robot element and said actuating member each forming at least one of said engaging portions engagable with a corresponding one of said two engaging portions of each of said parts, said corresponding engaging portions being formed to engage each other.

13. The robot joint as defined in claim 12, further comprising:

means for retaining each of said retaining ring parts on said other one robot element and including individual retaining cover plates, said cover plates being arranged so as to act radially with respect to said joint axis to retain said retaining ring parts on said other one robot element.

14. The robot joint as defined in claim 12, wherein one of said retaining ring parts is composed of a metal and the other of said ring parts is composed of a non-metal.

15. The robot joint as defined in claim 12, further comprising: means for sensing a zero position of the joint and including a sensor, said sensing means further includes a surface arranged opposite said sensor, said surface being formed on each of said retaining ring parts.

16. The robot joint as defined in claim 15, wherein said one of said retaining ring parts has a free side face arranged axially opposite said sensor.

17. The robot joint as defined in claim 14, wherein said retaining ring parts have different heights.

18. The robot joint as defined in claim 12, wherein said retaining ring is mountable on said other one robot element in at least two positions.

* * * * *